United States Patent [19]
Burkhart, Sr. et al.

[11] Patent Number: 6,036,217
[45] Date of Patent: Mar. 14, 2000

[54] METHOD AND APPARATUS FOR CONNECTING A TOWED VEHICLE TO A TOWING VEHICLE

[75] Inventors: M. Pike Burkhart, Sr.; Jamal U. Qattan, both of Cooper, Tex.

[73] Assignee: Chassis Dynamics, Inc., Enloe, Tex.

[21] Appl. No.: 09/311,622

[22] Filed: May 13, 1999

Related U.S. Application Data

[62] Division of application No. 08/735,826, Oct. 23, 1996, Pat. No. 5,924,716.

[51] Int. Cl.$^7$ ........................................................ B60D 1/01
[52] U.S. Cl. ........................ 280/476.1; 280/426; 280/442; 280/436
[58] Field of Search ............................... 280/476.1, 442, 280/418.1, 426, 433, 436

[56] References Cited

U.S. PATENT DOCUMENTS

| | | | |
|---|---|---|---|
| 1,150,727 | 8/1915 | Alexander . | |
| 1,712,063 | 5/1929 | Agramonte . | |
| 1,968,046 | 7/1934 | Linn | 280/33.4 |
| 2,059,975 | 11/1936 | Smith | 280/95 |
| 2,083,049 | 6/1937 | Byron | 280/81 |
| 2,336,814 | 12/1943 | Suter | 94/50 |
| 2,345,945 | 4/1944 | Miner | 280/33.4 |
| 2,395,640 | 2/1946 | Pearson | 280/81 |
| 2,491,063 | 12/1949 | Strong | 280/33.4 |
| 2,495,943 | 1/1950 | Peterson | 280/476.1 |
| 2,498,779 | 2/1950 | Winchester | 280/33.5 |
| 2,582,716 | 1/1952 | Caster | 16/44 |
| 2,643,895 | 6/1953 | Stover | 280/81 |
| 2,644,697 | 7/1953 | Peterson | 280/80 |
| 2,674,463 | 4/1954 | Peterson | 280/80 |
| 2,674,464 | 4/1954 | Peterson | 280/80 |
| 2,688,149 | 9/1954 | Popp | 16/18 |
| 2,690,916 | 10/1954 | Gilliam | 280/81 |
| 2,710,198 | 6/1955 | Hall | 280/81.5 |
| 2,812,193 | 11/1957 | Grace | 280/150.5 |
| 2,841,411 | 7/1958 | Sheppard et al. | 280/81 |
| 2,847,228 | 8/1958 | Hall | 280/81 |
| 2,848,244 | 8/1958 | Georgi | 280/81 |
| 2,851,280 | 9/1958 | Matteazzi et al. | 280/81 |
| 2,890,063 | 6/1959 | Stover | 280/109 |
| 2,919,928 | 1/1960 | Hoffer | 280/81 |
| 2,962,295 | 11/1960 | Tenenbaum | 280/81 |
| 2,976,051 | 3/1961 | Morey | 280/81 |
| 2,982,563 | 5/1961 | Gregg | 280/81 |
| 3,044,795 | 7/1962 | Standing et al. | 280/81 |
| 3,066,953 | 12/1962 | Chosy | 280/418 |
| 3,112,935 | 12/1963 | Gregg et al. | 280/81 |
| 3,149,858 | 9/1964 | Gilbert | 280/442 |

(List continued on next page.)

FOREIGN PATENT DOCUMENTS

| 651473 | 4/1951 | United Kingdom . | |
| 2245235 | 1/1992 | United Kingdom | B62D 17/00 |

*Primary Examiner*—Daniel G. DePumpo
*Attorney, Agent, or Firm*—Baker Botts L.L.P.

[57] ABSTRACT

An apparatus (110) is provided for connecting a towed vehicle (111) to a towing vehicle that includes a support structure (216) with a self-steer axle system (290) connected to the support structure. The self-steer axle system has a reversible axle caster angle changing mechanism. A fifth wheel receiver (120) for connecting the support structure to a towed vehicle is mounted on the support structure. Additionally a locking mechanism (125) that is operable to prevent rotation of the trailer with respect to the support structure is provided. A method for connecting a towed vehicle (111) to a towing vehicle to allow backing up of the towed vehicle is disclosed. The method includes the step (820) of attaching a towed vehicle to a fifth wheel receiver of a dolly having a self-steering axle system with reversible caster angle. Another step (810) of the method includes attaching the dolly to a towing vehicle. Yet another step (830) of the method includes preventing rotation of the trailer with respect to the dolly. Another step (840) includes selectively reversing the caster angle of the self-steer axle system to back up the towed vehicle.

20 Claims, 6 Drawing Sheets

U.S. PATENT DOCUMENTS

| | | | |
|---|---|---|---|
| 3,151,880 | 10/1964 | Black | 280/408 |
| 3,186,733 | 6/1965 | Langehennig | 280/446 |
| 3,204,977 | 9/1965 | Eisenhauer et al. | 280/81 |
| 3,284,094 | 11/1966 | Grace | 280/81 |
| 3,291,503 | 12/1966 | De Lay | 280/81 |
| 3,312,479 | 4/1967 | Cunha | 280/407 |
| 3,334,912 | 8/1967 | Mauck | 280/81 |
| 3,337,234 | 8/1967 | Ishizuka | 280/99 |
| 3,342,507 | 9/1967 | Koch et al. | 280/96.1 |
| 3,354,982 | 11/1967 | Schramm | 180/79.2 |
| 3,381,974 | 5/1968 | Carter, Jr. et al. | 280/81 |
| 3,393,922 | 7/1968 | Adams | 280/423 |
| 3,403,925 | 10/1968 | Sauer | 280/81 |
| 3,447,813 | 6/1969 | Wolf | 280/80 |
| 3,479,055 | 11/1969 | Cunha et al. | 280/407 |
| 3,520,549 | 7/1970 | De Lay | 280/81 |
| 3,522,956 | 8/1970 | Sauer et al. | 280/81 |
| 3,561,790 | 2/1971 | Jurgens | 280/423 |
| 3,704,896 | 12/1972 | Buelow | 280/81 A |
| 3,716,249 | 2/1973 | Schaeff | 280/81 A |
| 3,734,538 | 5/1973 | Humes | 280/426 |
| 3,827,723 | 8/1974 | Neff et al. | 280/476 R |
| 3,870,340 | 3/1975 | Winter | 280/415 B |
| 3,880,439 | 4/1975 | Wolter | 280/81 A |
| 3,880,440 | 4/1975 | Tidewell | 280/81 A |
| 3,883,151 | 5/1975 | Barchus | 280/80 R |
| 3,899,188 | 8/1975 | Curry | 280/81 A |
| 4,010,816 | 3/1977 | Powell | 180/144 |
| 4,025,084 | 5/1977 | Martel Mendez | 280/141 |
| 4,076,264 | 2/1978 | Chatterley | 280/81 A |
| 4,162,082 | 7/1979 | Curry | 280/476.1 |
| 4,195,856 | 4/1980 | Larson et al. | 280/81 R |
| 4,358,128 | 11/1982 | Chambers | 280/404 |
| 4,405,147 | 9/1983 | Horsman et al. | 280/443 |
| 4,441,730 | 4/1984 | Damm | 280/426 |
| 4,451,058 | 5/1984 | Curry | 280/423 A |
| 4,463,966 | 8/1984 | Stoddard | 280/442 |
| 4,484,758 | 11/1984 | Murray et al. | 280/442 |
| 4,524,841 | 6/1985 | Waggoner | 280/81 A |
| 4,650,205 | 3/1987 | Jarlsson | 280/408 |
| 4,705,133 | 11/1987 | Christenson et al. | 180/209 |
| 4,720,119 | 1/1988 | Ritter | 280/443 |
| 4,759,563 | 7/1988 | Nash | 280/423 A |
| 4,762,421 | 8/1988 | Christenson et al. | 366/54 |
| 4,763,923 | 8/1988 | Raidel | 280/704 |
| 4,768,802 | 9/1988 | Winkler | 280/408 |
| 4,770,430 | 9/1988 | Lange | 280/81 A |
| 4,786,114 | 11/1988 | Steiner et al. | 301/124 R |
| 4,824,135 | 4/1989 | McGregor | 280/442 |
| 4,856,804 | 8/1989 | Nash | 280/430 |
| 4,881,747 | 11/1989 | Raidel | 280/81.6 |
| 4,930,800 | 6/1990 | Jean-Luc | 280/446.1 |
| 4,966,383 | 10/1990 | Sjostrom | 280/404 |
| 4,988,115 | 1/1991 | Steinke | 280/404 |
| 5,011,177 | 4/1991 | Grice | 280/482 |
| 5,015,004 | 5/1991 | Mitchell | 280/81.6 |
| 5,018,756 | 5/1991 | Mitchell | 280/81.6 |
| 5,029,885 | 7/1991 | Steiner | 280/96.1 |
| 5,067,741 | 11/1991 | Ayme | 280/419 |
| 5,098,115 | 3/1992 | Haire et al. | 280/476.1 |
| 5,205,580 | 4/1993 | Luger et al. | 280/675 |
| 5,244,226 | 9/1993 | Bergh | 280/442 |
| 5,269,546 | 12/1993 | Pollock et al. | 280/81.6 |
| 5,320,376 | 6/1994 | Bojarski et al. | 280/442 |
| 5,364,113 | 11/1994 | Goertzen | 280/81.6 |
| 5,370,414 | 12/1994 | Tucke | 280/404 |
| 5,407,221 | 4/1995 | Haire et al. | 280/476.1 |
| 5,474,320 | 12/1995 | Bojarski et al. | 280/442 |
| 5,477,937 | 12/1995 | Chagnon | 180/24.01 |

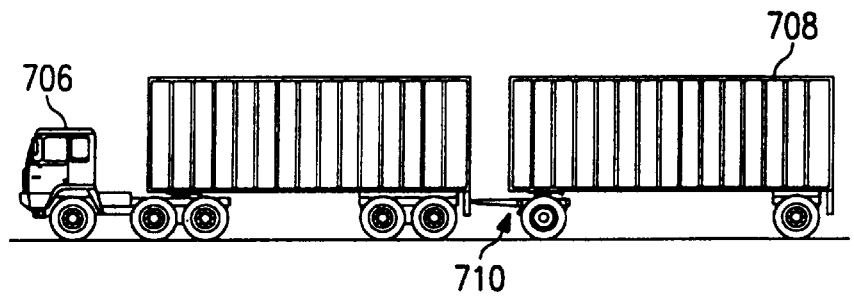
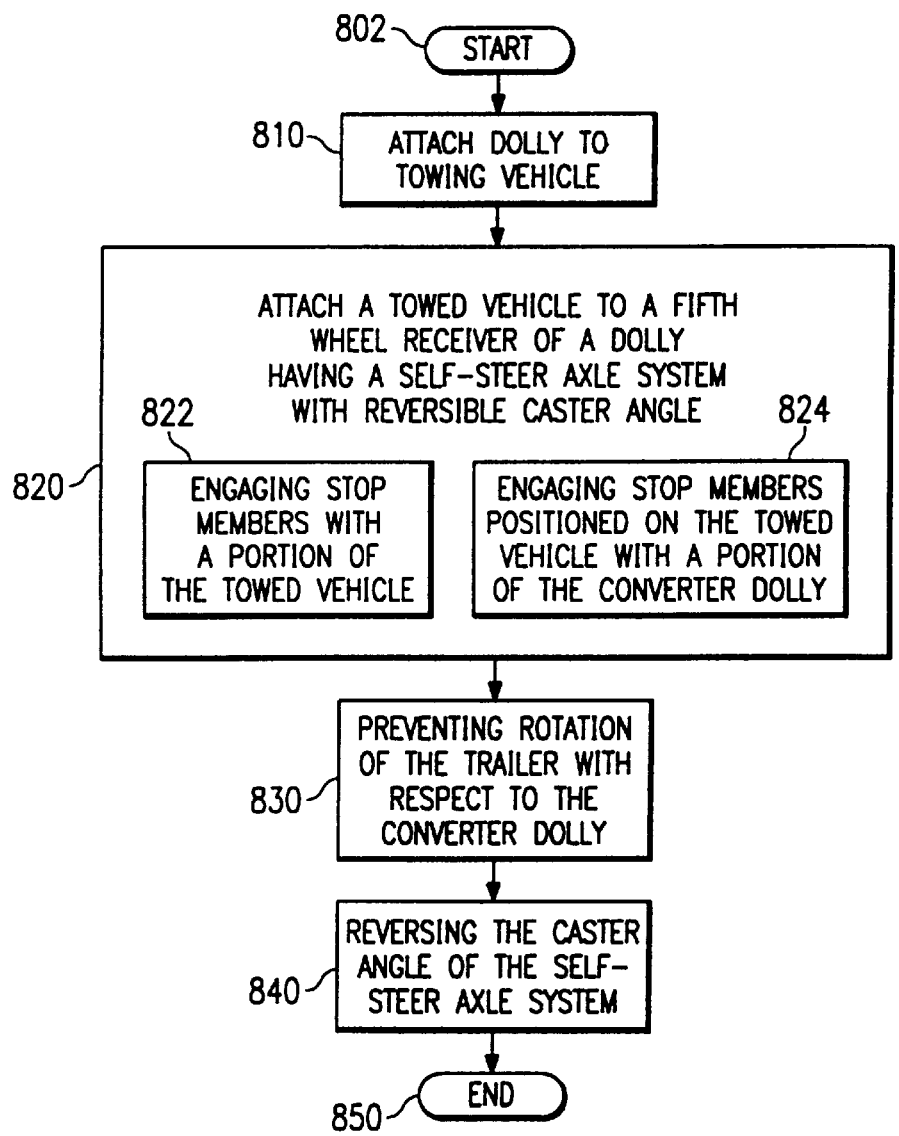

METHOD AND APPARATUS FOR CONNECTING A TOWED VEHICLE TO A TOWING VEHICLE

CROSS REFERENCE TO RELATED APPLICATIONS:

This application is a divisional of U.S. Application Ser. No. 08/735,826, filed Oct. 23, 1996 by M. Pike Burkhart, Sr. and Jamal U. Qattan entitled "Method and Apparatus for Connecting a Towed Vehicle to a Towing Vehicle", U.S. Pat. No. 5,924,716.

TECHNICAL FIELD OF THE INVENTION

This invention relates to towing of vehicles and more particularly a method and apparatus for connecting a towed vehicle to a towing vehicle.

BACKGROUND OF THE INVENTION

The use of towed vehicles, such as trailers has become increasingly popular in recent years. Particularly, the use of towed vehicles in tandem is popular. Tandem towing allows two or more vehicles to be towed by a single power vehicle such as a truck tractor. Highway trailers generally include one or more fixed rear axles and wheels that provide support for the trailer but can not be turned or steered. The front portion of a highway trailer typically includes a "fifth wheel," which allows the highway trailer to be releasable secured to and supported by the towing vehicle or truck tractor. A fifth wheel arrangement, which is common in the art and is described in U.S. Pat. No. 5,407,221, entitled Converter Dolly, supports the towed vehicle independent of the tractor and allows the towed vehicle to pivot relative to the towing vehicle and follow the tractor through turns. Highway trailers are frequently connected in tandem by a dolly having one or more axles and wheels appropriate for highway transportation.

A major problem that occurs in towing tandem trailers with a converter dolly is backing up the towed vehicles. While backing up, the towed vehicles will tend to move in the opposite direction of the tractor, causing "jackknifing" of the towed vehicles and making extremely difficult backing up of tandem trailers. Because of this problem, trailers in a tandem arrangement often must be disconnected from the converter dolly, connected to the tractor, and backed up individually. Backing up an individual trailer suffers from the same difficulties discussed above but to a lesser degree than backing up a tandem arrangement of trailers. Disconnecting the tandem arrangement and backing up each trailer individually increases delay and expense.

One attempt at solving the problem of backing up is described in U.S. Pat. No. 5,407,221, entitled Converter Dollyfor Permitting Backing Up of Tandem Trailers. The system described in the '221 Patent uses a two-part pivoting frame for the dolly to facilitate movement in the reverse direction and utilizes the fifth wheel to facilitate steering in the forward direction.

SUMMARY OF THE INVENTION

In accordance with the teachings of the present invention, a method and apparatus are provided that substantially eliminate or reduce disadvantages associated with prior systems and methods.

According to the teachings of the invention, an apparatus for connecting a towed vehicle to a towing vehicle is provided that includes a support structure with a self-steer axle system mounted thereon. The self-steer axle system has a reversible caster angle changing mechanism operable to allow the apparatus to selfsteer in both forward and reverse directions. A fifth wheel receiver is attached to the support structure for connecting the support structure to the towed vehicle. The fifth wheel receiver normally allows rotation of the towed vehicle relative to the support structure. Additionally, a locking mechanism is provided to prevent rotation of the towed vehicle with respect to the support structure.

According to the teachings of the invention, a method for connecting a towed vehicle to a towing vehicle is provided to facilitate backing up of the towed vehicle. The method includes the step of attaching a towed vehicle to a fifth wheel receiver of a dolly having a self-steering axle system with reversible axle caster angle. Another step of the method includes attaching the dolly to a towing vehicle. Yet another step of the method includes preventing rotation of the towed vehicle with respect to the dolly. Another step includes selectively reversing the caster of the selfsteer axle system to back up the towed vehicle.

A technical advantage of the invention is that it provides a method and apparatus that facilitates backing up of trailers.

Another technical advantage of the invention is that it provides a method and apparatus that allows for the backing up of tandem trailers without disconnecting a dolly.

Another technical advantage of the invention is that it provides a method and apparatus that allows the reversing of a dolly axle caster angle to facilitate steering of a towed trailer in both forward and reverse direction.

Another technical advantage of the invention is that it provides a dolly with a suspension on a self-steering axle that permits travel at highway speeds.

Another technical advantage of the invention is that it provides a method and apparatus that may be easily and economically incorporated with existing highway trailers.

BRIEF DESCRIPTION OF THE DRAWINGS

A more complete understanding of the advantages of the present invention may be acquired by referring to the FIGURES in which like reference numbers represent like features and wherein:

FIG. 7 is a schematic drawing showing a side elevational view of another embodiment of the present invention; and FIG. 8 is a flow chart illustrating one method for backing up a towed vehicle according to teachings of the invention.

DETAILED DESCRIPTION OF THE INVENTION

The preferred embodiments of the present invention and its advantages are best understood by referring to FIGS. 1–8 of the drawings, like numerals being used for like and corresponding parts of the various drawings.

Figure 1:
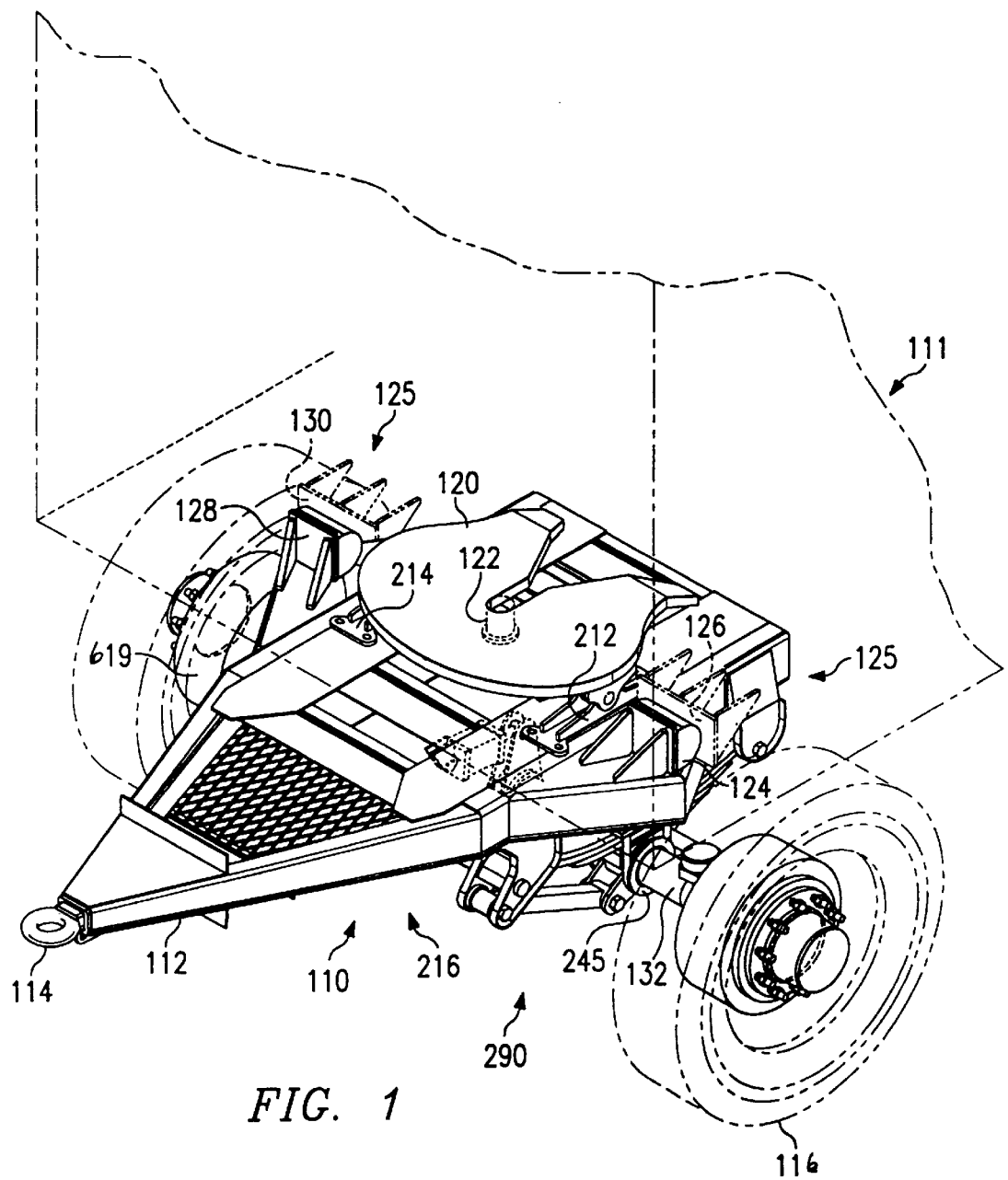
FIG. 1 is a perspective view with portions broken away showing one embodiment of the invention.
Figure 2:
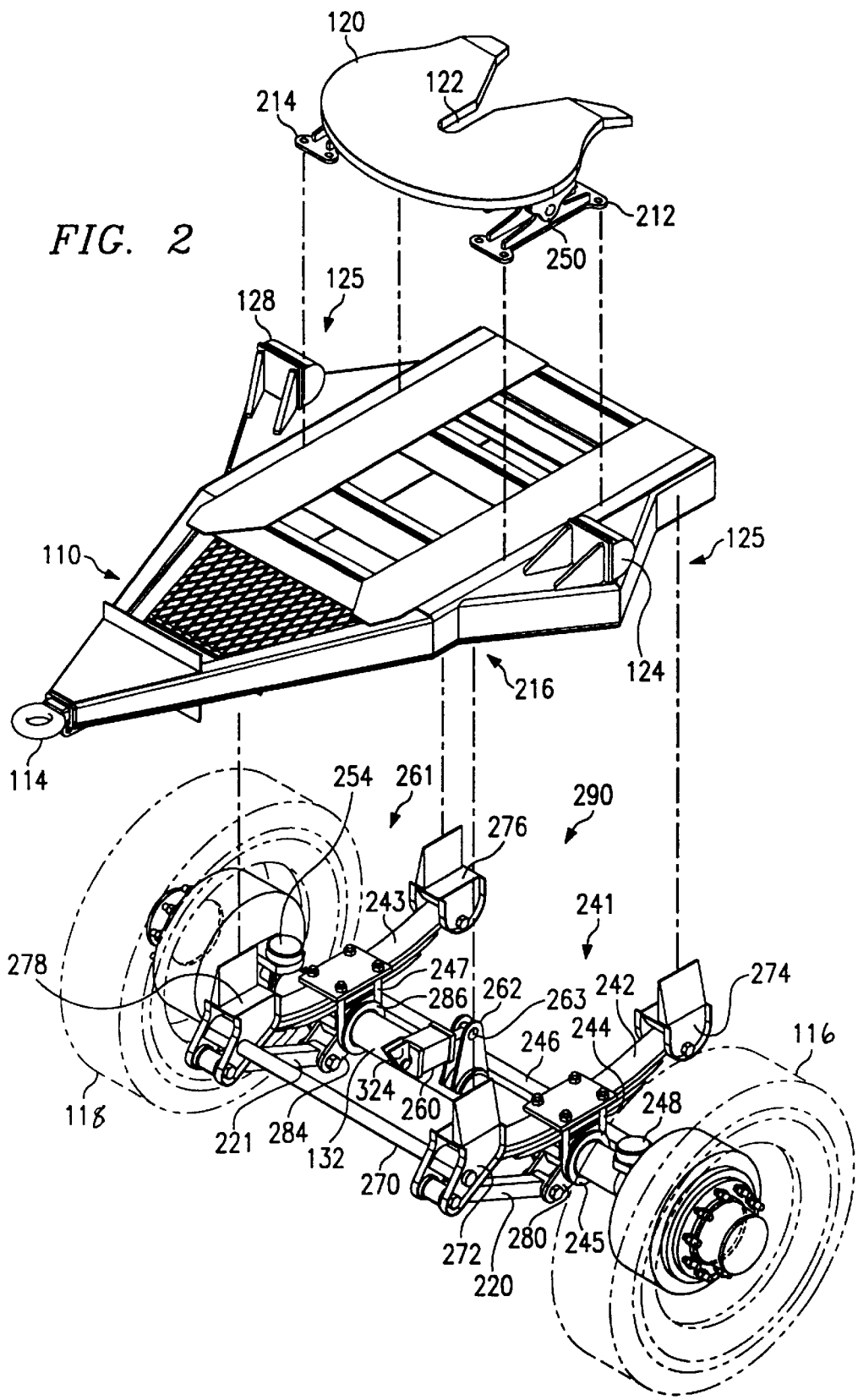
FIG. 2 is an exploded view with portions broken away of the dolly shown in FIG. 1, showing examples of a fifth wheel locking mechanism and a self steer axle system according to teachings of the invention.

FIG. 1 is a perspective view of one embodiment of invention and FIG. 2 is an exploded view of FIG. 1. In FIG. 1, dolly 110, which is one embodiment of the invention, is shown connected to trailer 111. Dolly 110 includes a fifth wheel receiver 120 for releasable engagement with the trailer 111 and for connecting the dolly 110 to the trailer 111. The fifth wheel receiver 120 includes a kingpin receiver 122 for receiving a kingpin 326 (FIG. 3) on the trailer 111. Fifth wheel receivers such as receiver 120 in conjunction with kingpins such as kingpin 326 form a connection between a dolly and a trailer. Such a connection is known generally as a "fifth wheel." One patent describing such a connection is U.S. Pat. No. 5,407,221, entitled Converter Dolly, which is hereby incorporated by reference for all purposes. A "fifth wheel" generally allows for pivoting of a trailer with respect to a dolly, thus allowing for steering of the trailer.

Dolly 110, which represents one embodiment of the present invention, also includes self-steer axle system 290 (shown more clearly in FIG. 2) for allowing self-steering of the dolly in both forward and reverse directions. Dolly 110 also includes axle 132 and axle caster angle changing mechanism 260 (FIG. 3), which pivots axle 132 to adjust the caster angle of the self-steer axle system 290 and to allow the axle to self-steer while backing up trailer 111. Coupled to the axle 132 through first and second self-steering wheels 619 and 617 (FIG. 6) are first and second self-steering tires 118 and 116. Self-steer axle systems are generally known in the art. Examples of U.S. Patents describing self-steer axle systems include U.S. Pat. No. 2,674,697, entitled Reversible Castering Wheel Structure, and U.S. Pat. No. 3,186,733, entitled Trailer Steering Control Device. These patents are incorporated herein for all purposes.

Dolly 110 includes a support structure 216 (FIG. 2). In the embodiment shown in FIGS. 1–6, fifth wheel receiver 120 attaches to support structure 216. FIGS. 1 and 2 show that a fifth wheel receiver, such as 120, may be attached to support structure 216 through connections 212 and 214; however, it should be understood that a fifth wheel receiver suitable for use with the invention could be formed integral with a support structure such as support structure 216. The support structure 216 of dolly 110 includes a draw bar 112. On one end of draw bar 112 is an apertured fitting or hitch 114 for connection to a towing vehicle.

Dolly 110 also includes a locking mechanism 125 operable to prevent rotation of a trailer, such as trailer 111, with respect to the support structure 216. In the embodiment shown in FIG. 1, the rotation that is prevented is rotation of trailer 111 about the fifth wheel receiver 120. As discussed in greater detail below, locking mechanism 125 allows the dolly 110 to steer the trailer 111 without rotation of the trailer 111 about the fifth wheel receiver 120. In the embodiment shown in FIGS. 1 and 2, the locking mechanism 125 includes first and second dolly mounted fifth wheel stops 124 and 128 for engagement with a portion of the trailer 111. For example, stops 124 and 128 engage with trailer mounted stops, such as first and second trailer mounted stops 126 and 130, shown in FIG. 1. Another method for preventing rotation of a trailer with respect to its associated support structure is described in U.S. Pat. No. 5,407,221, entitled Converter Dolly, which is incorporated herein for all purposes. Numerous other techniques for preventing rotation of a trailer with respect to a support structure of a dolly may be used without departing from the scope of the invention.

In FIG. 2, the fifth wheel receiver 120 is shown with a pair of hinges 250 for pivoting of the fifth wheel receiver 120 to facilitate insertion of the kingpin 326. The leaf spring suspension system 241, shown in FIG. 2 suspending the support structure 216 near tire 116, is one example of a mechanism for suspending the support structure 216. An analogous suspension system 261 suspends support structure 216 near tire 118. Other examples of suspension systems suitable for use with the invention are given in U.S. Pat. Nos. 5,015,004 entitled Elevating, Reversible Self-Steering Suspension System; 4,881,747 entitled Self-Steering Suspension Assembly; 5,018,756 entitled Controlfor Self-Steering Suspension Assembly; and 4,770,430 entitled Self-Steering Axle Assembly for Vehicles. These patents are incorporated herein for all purposes. Connected to tie rod 246 are knuckle assemblies 248 and 254 for allowing the self-steering tires 116 and 118 to self-steer. As shown best in FIG. 6, knuckle assembly 248 is in turning engagement with wheel 617 and knuckle assembly 254 is in turning engagement with wheel 619. In the embodiment shown in FIGS. 1–6, knuckle assemblies 248 and 254 rotate about a substantially vertical axis, As will be described in more detail in conjunction with FIGS. 3 and 4, the caster angle orientation of knuckle assemblies 248 and 254 may be adjusted depending on whether the dolly 110 is moving in a forward or reverse direction.

Support structure 216 is mounted on axle 132 by four mounting brackets 272, 274, 276 and 278 extending from leaf springs 242 and 243. Connected to mounting brackets 272 and 274 are leaf springs 242 for suspending support structure 216 near self-steering tire 116. Connected to mounting brackets 276 and 278 are leaf springs 243 for suspending support structure 216 near self-steering tire 118. Attached to leaf springs 242 is U-shaped support member 244 extending from the leaf springs 242 and encircling bearing 245. Bearing 245 connects with first linkage 220 through a second linkage 280. First linkage 220 in turn couples with mounting bracket 272. Linkages 284 and 221, bearing 286, and U-shaped support member 247 perform analogous functions in conjunction with leaf springs 243 and mounting brackets 276 and 278 in suspension system 261. Cross member 270 provides lateral support between mounting brackets 272 and 278.

As shown in FIG. 2, axle caster angle changing mechanism 260 engages with axle member 262, which is fixedly attached to axle 132 at connection 263, to pivot axle 132 within bearings 245 and 286 in order to change the caster angle of the self-steering axle system 290. Axle caster changing mechanism 260 is attached to the bottom surface of support structure 216. Extending from one end of axle caster angle changing mechanism 260 is linkage receiver 324. Linkage receiver 324 may be connected to an extension linkage (not explicitly shown) for adjusting the caster angle of the self-steering axle system 290 from a remote location.

Figure 3:
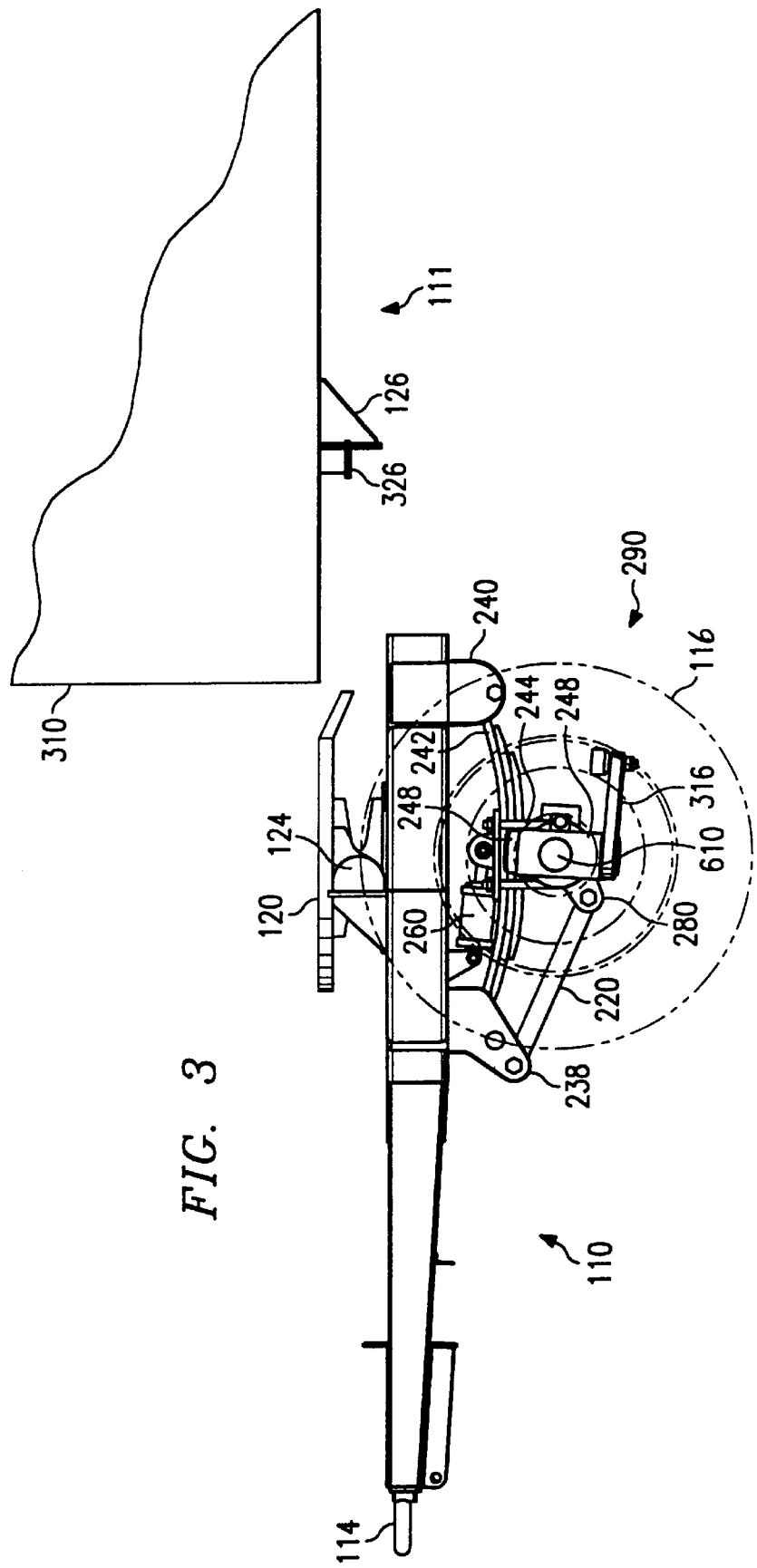
FIG. 3 is a side elevational view with portions broken away of the dolly shown in FIG. 1 showing one example of a self-steer axle system according to the teachings of the invention before connection of a trailer to the dolly.

FIG. 3 is a side elevational view of the dolly shown in FIG. 1 before connection of the trailer to the dolly 110. FIG. 3 shows more clearly one position of the self-steering axle system 290. FIG. 3 shows the self-steering axle system in a forward caster position, which corresponds to a forward direction of travel for dolly 110. Although a variety of types of self-steering axle systems with reversible caster could be used in the invention, one exemplary system is shown in FIG. 3. As discussed above, a tie rod 246 (see also FIGS. 5 and 6) connects knuckle assemblies 248 and 254 through linkages 316 and 516 (FIG. 5) so that self-steering tires 116 and 118 may self-steer in the same direction. In the embodiment shown in FIGS. 1–6, knuckle assemblies 248 and 254 rotate about a substantially vertical axis. Knuckle assembly 248 is fixedly attached to axle 132 such that pivoting of axle 132, such as through actuation of axle caster angle changing mechanism 260, causes pivoting of knuckle assembly 248 with respect to tire 116. Knuckle assembly 254 is substantially similar to knuckle assembly 248.

Figure 4:
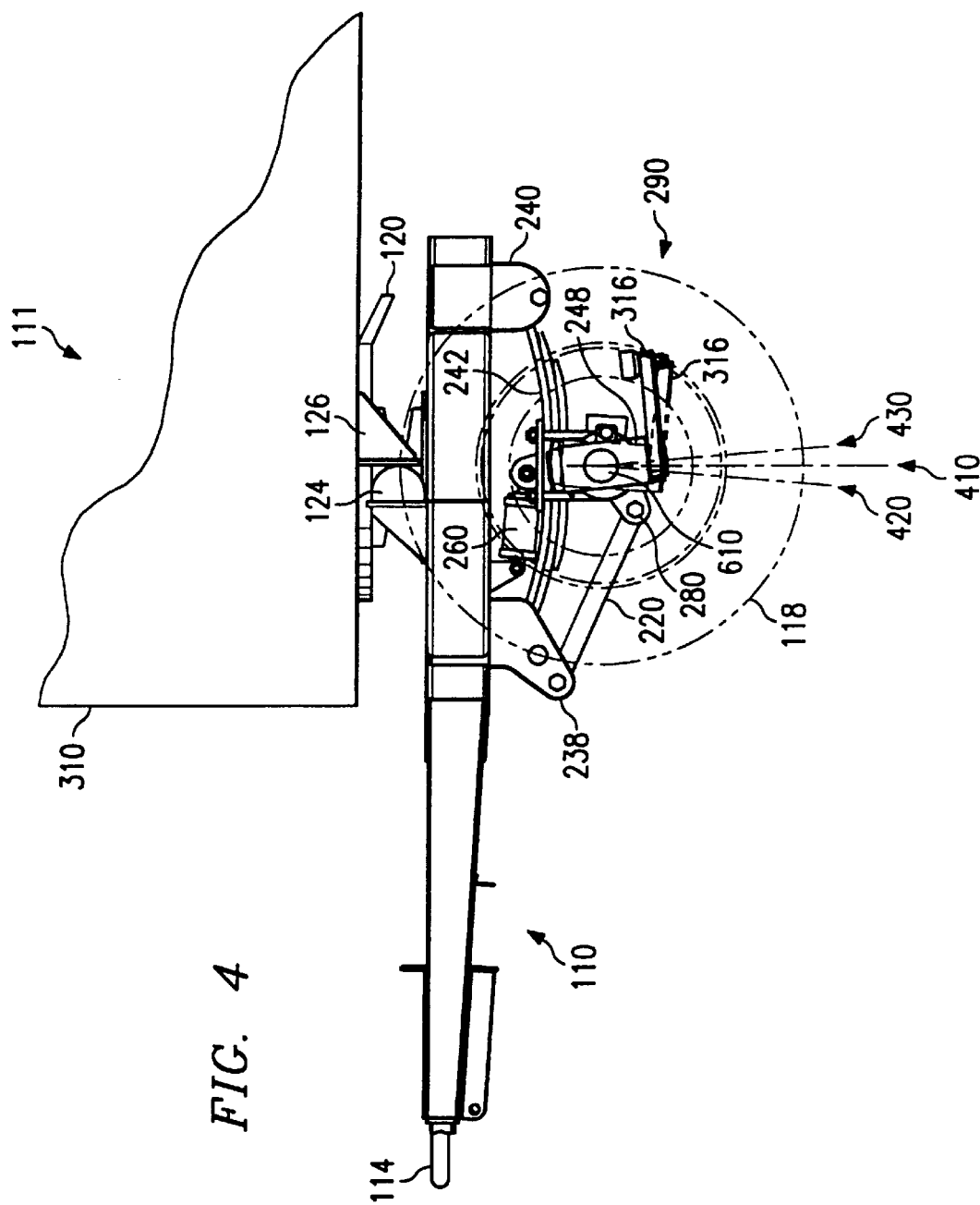
FIG. 4 is a side elevational view with portions broken away of the dolly shown in FIG. 1 showing one example of a self-steer axle system according to the teachings of the invention after connection of a trailer to the dolly.

FIG. 4 is a side elevational view of the dolly shown in FIG. 1 after connection of the trailer to the dolly. FIG. 4 shows more clearly one side of the self-steering axle system 290 for both forward and reverse caster orientations.

Figure 5:
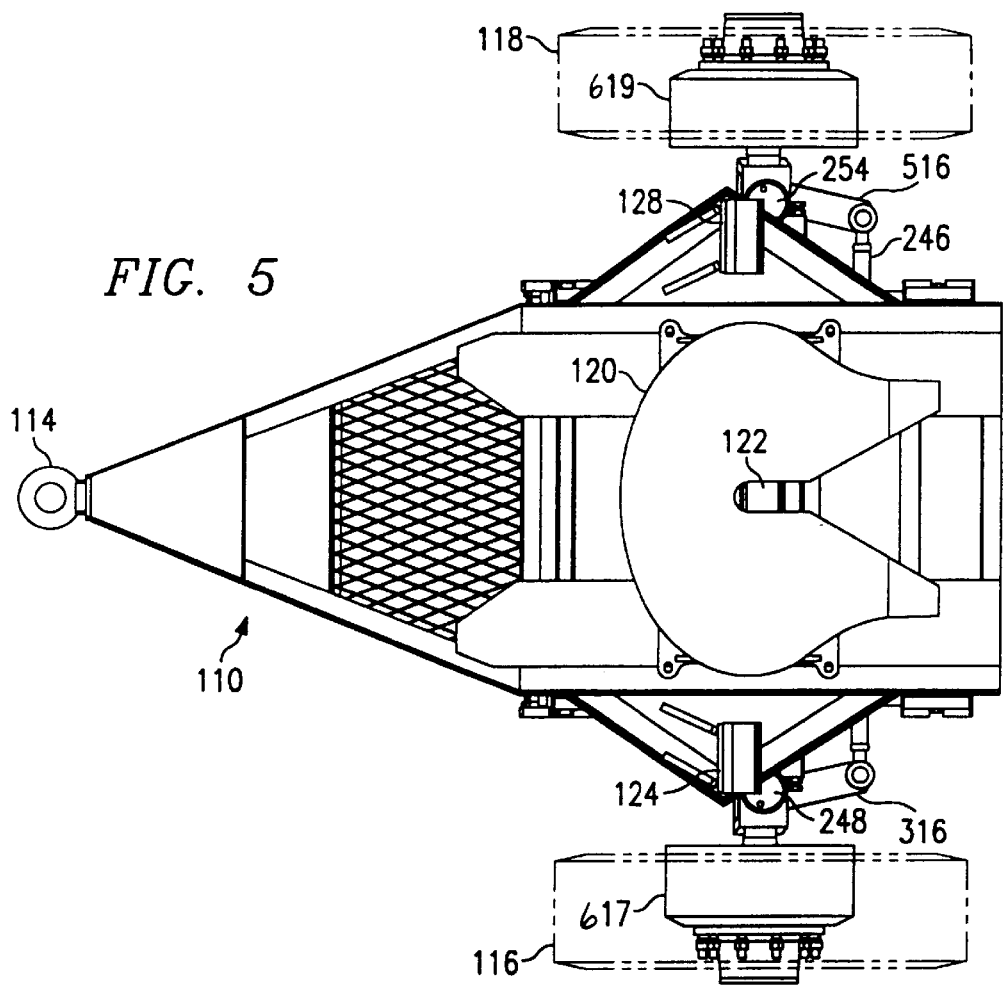
FIG. 5 is a top plan view with portions broken away of the dolly shown in FIG. 1 showing a top view of one example of a self-steer axle system according to teachings of the invention.

FIG. 5 is a top plan view of the dolly shown in FIG. 1. In FIG. 5, linkage 516, which connects tie rod 246 to knuckle assembly 254 is shown. A similar linkage 316 is also shown for connecting tie rod 246 to knuckle assembly 248.

Figure 6:
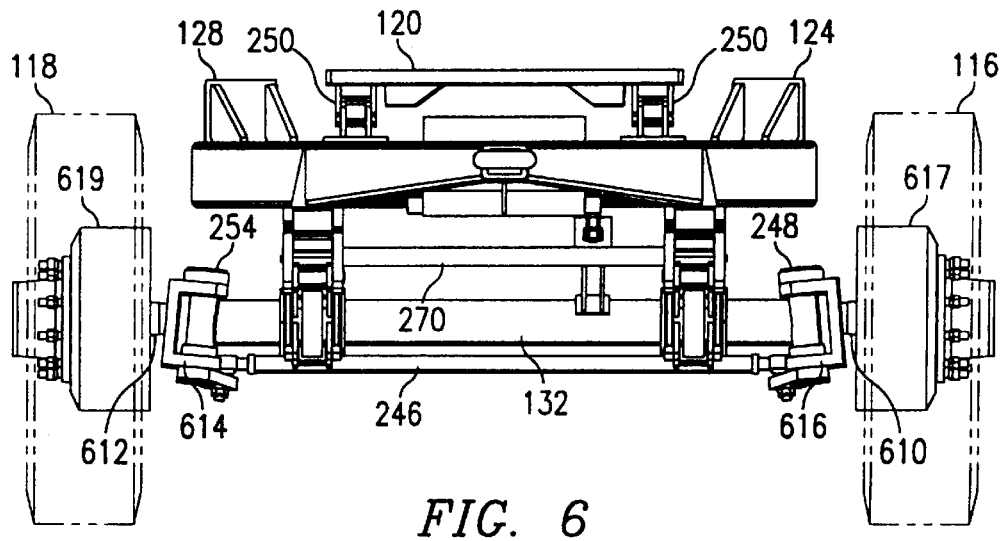
FIG. 6 is a front elevational view with portions broken away of the dolly shown in FIG. 1 showing a front view of one example of a self-steer axle system according to teachings of the invention.

FIG. 6 is a front elevational view of the dolly shown in FIG. 1. In FIG. 6 the connection of knuckle assemblies 248 and 254 to the self-steering tires 116 and 118 is more clearly shown. Wheel 619 rotates with stub axle 612, which in turn is journaled within knuckle linkage 614. Similarly, wheel 617 rotates with stub axle 616, which in turn is journaled within knuckle linkage 616. Linkages 614 and 616 rotate about a substantially vertical axis along with knuckle assemblies 254 and 248 with their rotation tied to each other through tie rod 246 to allow self-steering of self-steering wheels 619 and 617 and self-steering tires 118 and 116.

With reference to FIGS. 1–6, the operation of dolly 110, which is one embodiment of the present invention, will be described. Dolly 110 is connected to trailer 111 through fifth wheel receiver 120, kingpin 326, and kingpin receiver 122. Such a connection is well known in the art. Rotation of the trailer 111 with respect to the support structure 216 is prevented through engagement of first and second dolly stops 124 and 128 with a portion of the trailer 111, such as trailer stops 126 and 130. Prevention of rotation of the trailer 111 with respect to the support structure 216 in conjunction with the self-steer axle system 290 allows backing up of trailer 111 by an experienced driver without "jackknifing."

With the prevention of rotation of the trailer 111 with respect to the support structure 216, steering of trailer 111 is accomplished through self-steering axle system 290. The point of rolling resistance is generally known as the contact point of a castering wheel, such as a self-steering tire 116, with the ground and is denoted by numeral 410 in FIG. 4. During forward movement, self-steering tires 118 and 116 will have knuckle assemblies 254 or 248 longitudinally spaced from the point of rolling resistance so that a vertical centerline though the knuckle assembly intersects the ground at a point ahead of the rolling resistance during forward movement of dolly 110. This allows the self-steering wheels 617 and 619 and self-steering tires 116 and 118 to follow the direction of movement of the dolly 110 when dolly 110 is moving in a forward direction. Such a vertical centerline is designated by reference numeral 420 in FIG. 4. Conversely during reverse movement, the vertical centerline through the knuckle assembly will intersect the ground at a point behind the rolling resistance, thus allowing the self-steering wheels 617 and 619 and self-steering tires 116 and 118 to follow the direction of movement of the dolly 110 when dolly 110 is moving in a reverse direction. Such a centerline is denoted by reference numeral 430 in FIG. 4.

When it is desired for the trailer to move in the forward direction, axle caster angle changing mechanism 260 is adjusted to place knuckle assemblies 248 and 254 in the position shown in FIG. 3, which is also designated by centerline 420 in FIG. 4. With the caster in this position, self-steering tires 118 and 116 are allowed to self-steer when the dolly 110 is moving in a forward position. Thus trailer 111 may be steered without rotation with respect to the support structure 216, contrary to the conventional method utilized with a fifth wheel connection. When it is desired for the trailer to move in a reverse direction, axle caster angle changing mechanism 260 is adjusted to align knuckle assemblies 248 and 254 with centerline 430 as shown in FIG. 4. With the caster in this position, self-steering tires 118 and 116 are allowed to self-steer while dolly 110 is moving in the reverse direction, thus allowing steering of the trailer 111 in a reverse direction.

By preventing rotation of a trailer 111 with respect to the support structure 216 and by steering through the use of a self-steer axle system 290, one or more dollies, such as dolly 111, provide a mechanism for towing and steering one or more trailers in either a forward or reverse direction. In addition the use of the fifth wheel receiver 120 provides for a simple and inexpensive connection between a dolly and conventional trailers. The incorporation of a suspension system, for example the leaf spring suspension systems 241 and 243, provides stability to the dolly-trailer system that allows use of dolly 110 at highway speeds.

A second embodiment of the present invention is shown in FIG. 7. In FIG. 7, a trailer system 702 is shown. Connecting a towing vehicle or tractor-trailer combination 706 to a towed vehicle or trailer 708 is a dolly 710. Dolly 710 is formed in accordance with the teachings of the present invention and includes various features associated with dolly 110.

Another embodiment of the invention is shown FIG. 8, which illustrates a flow chart for one embodiment of a method for connecting a towed vehicle to a towing vehicle to allow backing up of the towed vehicle. At step 810, the dolly is attached to a towing vehicle. It should be understood that a towing vehicle could include a trailer that is towed by another vehicle. At step 820 a towed vehicle is attached to a fifth wheel receiver of a dolly having a self-steer axle with a reversible caster angle. At step 830 rotation of the trailer with respect to the dolly is prevented. Step 840 includes selectively reversing the caster angle of the self-steer axle system. Step 820 may include step 822, which includes engaging stop members on the dolly with a portion of the towed vehicle. Step 820 may also include step 824, which includes engaging stop member positioned on the towed vehicle with a portion of the dolly.

Although the present invention has been described in detail, it should be understood that various changes, alterations, and modifications can be made to the teachings described herein without departing from the spirit and scope of the present invention which is solely defined by the appended claims.

What is claimed is:

1. A method for connecting a towed vehicle to a towing vehicle to facilitate backing up the towed vehicle, comprising the steps of:

rotatably and releasably connecting the towed vehicle to a fifth wheel receiver of a dolly, the dolly having a self-steer axle system with a reversible axle caster angle;

attaching a single point towing connection of the dolly to a towing vehicle;

preventing rotation of the towed vehicle with respect to the dolly by engaging a portion of the dolly with the towed vehicle; and selectively reversing the caster angle of the self-steer axle system to self-steer the towed vehicle in a reverse direction.

2. The method of claim 1 wherein the step of preventing rotation of the towed vehicle with respect to the dolly comprises engaging at least one stop member positioned on the dolly with a portion of the towed vehicle.

3. The method of claim 1 and wherein the step of preventing rotation of the towed vehicle with respect to the dolly comprises engaging a stop member positioned on the towed vehicle with a portion of the dolly.

4. The dolly of claim 1 wherein the self-steer axle system further comprises a suspension system.

5. The dolly of claim 4 wherein the suspension system comprises a leaf spring suspension system.

6. The method of claim 1 wherein the step of preventing rotation of the towed vehicle with respect to the dolly comprises engaging at least one stop member positioned on the dolly with at least one stop member positioned on the towed vehicle.

7. A method for connecting a towed vehicle to a towing vehicle comprising:

rotatably and releasably connecting the towed vehicle to a fifth wheel receiver of a support structure, the support structure having a self-steer axle system;

preventing rotation of the towed vehicle about the fifth wheel receiver;

connecting a single point towing connection of the support structure to the towing vehicle; and selectively reversing an axle caster changing mechanism of the self-steer axle system to allow self-steer of the support structure in both forward and reverse directions.

8. The method of claim 7, wherein the step of preventing rotation of the towed vehicle about the fifth wheel receiver comprises engaging at least one stop member positioned on the support structure with a portion of the towed vehicle.

9. The method of claim 7, wherein the step of rotatably and releasably connecting the towed vehicle to a fifth wheel receiver further comprises receiving a kingpin of the towed vehicle in a kingpin receiver of the support structure.

10. The method of claim 7, wherein the step of connecting the support structure to the towing vehicle comprises connecting an aperture of a generally circular member of the single point towing connection to the towing vehicle.

11. The method of claim 7, wherein the step of connecting the support structure to the towing vehicle comprises connecting a hitch of the single point towing connection to the towing vehicle.

12. The method of claim 7, wherein the step of preventing rotation of the towed vehicle about the fifth wheel receiver comprises:

engaging a first stop member positioned on the support structure with a second stop member positioned on the towed vehicle; and engaging a third stop member positioned on the support structure with a fourth stop member positioned on the towed vehicle, wherein the towed vehicle is connected to the support structure between the first and third stop members.

13. The method of claim 7, wherein the step of rotatably and releasably connecting the towed vehicle to the fifth wheel receiver further comprises receiving a kingpin of the towed vehicle in a kingpin receiver of the support structure, the kingpin receiver disposed between a first side and a second side of the fifth wheel receiver.

14. A method for connecting a trailer to a dolly comprising:

rotatably and releasably connecting the trailer to a fifth wheel receiver of the dolly, the dolly having a self-steer axle system and a single-point towing connection;

preventing rotation of the trailer about the fifth wheel receiver; and selectively reversing an axle caster changing mechanism of the self-steer axle system to allow self-steer of the dolly in both forward and reverse directions.

15. The method of claim 14, wherein the step of preventing rotation of the trailer about the fifth wheel receiver comprises engaging at least one stop member positioned on the dolly with a portion of the trailer.

16. The method of claim 14, wherein the step of preventing rotation of the trailer about the fifth wheel receiver comprises engaging at least one stop member positioned on the dolly with a portion of the trailer.

17. The method of claim 14, wherein the step of rotatably and releasably connecting the trailer to the fifth wheel receiver further comprises receiving a kingpin of the trailer in a kingpin receiver of the dolly.

18. The method of claim 14, wherein the step of preventing rotation of the trailer about the fifth wheel receiver comprises:

engaging a first stop member positioned on the dolly with a second stop member positioned on the trailer; and engaging a third stop member positioned on the dolly with a fourth stop member positioned on the trailer, wherein the trailer is connected to the dolly between the first and third stop members.

19. The method of claim 14, wherein the step of preventing rotation of the trailer about the fifth wheel receiver comprises engaging at least one stop member positioned on the trailer with a portion of the dolly.

20. The method of claim 14, wherein the step of rotatably and releasably connecting the trailer to the fifth wheel receiver further comprises receiving a kingpin of the trailer in a kingpin receiver of the dolly, the kingpin receiver disposed between a first side and a second side of the fifth wheel receiver.

* * * * *